(12) United States Patent
Kim et al.

(10) Patent No.: US 9,214,976 B2
(45) Date of Patent: Dec. 15, 2015

(54) DISPLAY APPARATUS

(71) Applicant: SAMSUNG ELECTRONICS CO., LTD., Suwon-si (KR)

(72) Inventors: In-beom Kim, Seoul (KR); Chang-joo Jung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 175 days.

(21) Appl. No.: 13/677,936

(22) Filed: Nov. 15, 2012

(65) Prior Publication Data

US 2013/0316664 A1 Nov. 28, 2013

(30) Foreign Application Priority Data

May 25, 2012 (KR) .................... 10-2012-0056140

(51) Int. Cl.
| | |
|---|---|
| *H04M 1/00* | (2006.01) |
| *H04B 1/38* | (2015.01) |
| *H04N 5/64* | (2006.01) |
| *G06F 1/16* | (2006.01) |
| *H01Q 1/22* | (2006.01) |

(52) U.S. Cl.
CPC .. *H04B 1/38* (2013.01); *H04N 5/64* (2013.01); *G06F 1/1601* (2013.01); *H01Q 1/2266* (2013.01)

(58) Field of Classification Search
CPC ........................ H04M 1/7253; G06F 1/1626
USPC ............ 455/566, 41, 2, 550.1; 345/173, 156, 345/2.3, 3.1, 104, 204
See application file for complete search history.

(56) References Cited

U.S. PATENT DOCUMENTS

| | | | |
|---|---|---|---|
| 6,717,567 B1 * | 4/2004 | Bowden et al. ............... | 345/104 |
| 7,321,334 B2 * | 1/2008 | Yu .................. | 343/702 |
| 8,125,772 B2 * | 2/2012 | Kim ......................... | 361/679.24 |
| 8,138,978 B1 * | 3/2012 | Vier et al. ..................... | 343/702 |
| 8,498,656 B2 * | 7/2013 | Mujtaba et al. ............... | 455/458 |

(Continued)

FOREIGN PATENT DOCUMENTS

| | | |
|---|---|---|
| EP | 2403240 A1 | 1/2012 |
| JP | 2004005516 A | 1/2004 |

(Continued)

OTHER PUBLICATIONS

Communication dated Aug. 7, 2013, issued by the European Patent Office in counterpart European Application No. 13152284.9.

(Continued)

*Primary Examiner* — Sonny Trinh (74) *Attorney, Agent, or Firm* — Sughrue Mion, PLLC (57) ABSTRACT

A display apparatus including a display module further including a control board for controlling an operation of the display module to display an image. An outer casing unit accommodates the display module, and a wireless communication unit performs wireless communication with an external communication device. The wireless communication unit includes at least one antenna for transmitting and receiving a radio signal to and from the external communication device, and a wireless communication board converts the radio signal received from the antenna into an electrical signal and transmits the electrical signal to the control board or transmits the electrical signal provided from the control board to the antenna, wherein the antenna and the wireless communication board are arranged to be spatially separated from each other.

17 Claims, 5 Drawing Sheets

(56) References Cited

U.S. PATENT DOCUMENTS

| | | | |
|---|---|---|---|
| 8,570,226 B2* | 10/2013 | Kao et al. | 343/702 |
| 8,704,777 B2* | 4/2014 | Small et al. | 345/173 |
| 2003/0125070 A1* | 7/2003 | Wagner et al. | 455/550 |
| 2007/0200963 A1 | 8/2007 | Shin | |
| 2007/0273595 A1 | 11/2007 | Shimasaki et al. | |
| 2010/0141613 A1* | 6/2010 | Sonobe | 345/204 |
| 2010/0270190 A1* | 10/2010 | Howard | 206/320 |
| 2012/0235635 A1* | 9/2012 | Sato | 320/108 |

FOREIGN PATENT DOCUMENTS

| | | |
|---|---|---|
| KR | 100850915 B1 | 8/2008 |
| KR | 100860177 B1 | 9/2008 |

OTHER PUBLICATIONS

Communication dated Feb. 25, 2015, issued by the European Patent Office in counterpart European Application No. 13152284.9.

* cited by examiner

DISPLAY APPARATUS

PRIORITY

This application claims priority under 35 U.S.C. §119(a) from Korean Patent Application No. 10-2012-0056140 filed on May 25, 2012, in the Korean Intellectual Property Office, the disclosure of which is incorporated herein by reference, in its entirety.

BACKGROUND

1. Field

The present inventive concept relates to a display apparatus. More particularly, the inventive concept relates to a display apparatus provided with a wireless communication unit.

2. Description of the Related Art

With the development of the wireless communication field, electronic devices such as smart phones have changed human lifestyles. Recently, even display devices such as TVs which can perform wireless communication such as WiFi or Bluetooth have been released.

In a display apparatus in the related art, a wireless module for wireless communication, such as a WiFi module or a Bluetooth module, is separately installed in the form of a package. According to such a wireless module, various kinds of circuits including an antenna are all installed in one package, and the circuits in the package are connected to a control board through a plurality of cables. The wireless module is installed in the vicinity of the border inside the display apparatus in order to improve the sensitivity and efficiency of the antenna.

However, the display apparatus in the related art has a problem that a space which corresponds to the thickness of the wireless module installed in the display apparatus is required, and this hinders the slimming of the display apparatus.

Further, since the display apparatus in the related art requires a plurality of cables to connect the wireless module to the control board, and the control board requires corresponding connectors, the manufacturing cost of the display apparatus is increased, and the productivity thereof is decreased.

Further, since the wireless module is connected with the plurality of cables in the display apparatus in the related art, there is a high possibility that crosstalk can occur between adjacent cables.

SUMMARY

The present inventive concept has been made to address at least the above problems and/or disadvantages and to provide at least the advantages described below. Accordingly, an aspect of the present inventive concept provides a display apparatus that can both perform wireless communication and result in slimming of the display apparatus.

According to one aspect of the present inventive concept, a display apparatus includes a display module having a control board which controls an operation of the display module in order to display an image; an outer casing unit accommodating the display module; and a wireless communication unit which performs wireless communication with an external communication device, wherein the wireless communication unit includes at least one antenna for transmitting and receiving a radio signal to and from the external communication device; and a wireless communication board which converts the radio signal received from the antenna into an electrical signal to transmits the electrical signal to the control board or transmits the electrical signal provided from the control board to the antenna, wherein the antenna and the wireless communication board are spatially separated from each other.

The antenna may be installed in the outer casing unit, and the wireless communication board may be installed in the display module, but is not limited thereto.

The display module may include a liquid crystal panel which creates the image; a backlight unit which supplies light for creating the image to the liquid crystal panel; and a top chassis and a bottom chassis which accommodate therein the liquid crystal panel and the backlight unit.

The wireless communication board may be installed in the bottom chassis.

The control board may be installed in the bottom chassis, and the wireless communication board may be installed on the control board.

The antenna and the wireless communication board may be installed in the display module.

The display module may include a liquid crystal panel which creates the image; a backlight unit which supplies light for creating the image to the liquid crystal panel; and a top chassis and a bottom chassis which accommodate therein the liquid crystal panel and the backlight unit.

The antenna may be installed in the top chassis.

The display module may further include a bracket which installs the antenna in the top chassis.

The bracket may be made of a non-metallic material.

The control board may be installed in the bottom chassis, and the wireless communication board may be installed on the control board.

The outer casing unit may include a front case having a product logo; and a rear casing coupled to the front casing, wherein the product logo is arranged in front of the antenna.

The product logo may be directly formed on the antenna.

The antenna and the wireless communication board may be connected to each other through a signal cable.

The wireless communication unit may perform wireless communication according to at least one method of WiFi and Bluetooth.

The antenna may be a film antenna.

As described above, according to various exemplary embodiments of the present inventive concept, since the slimming display apparatus can be implemented and the wireless communication unit can be installed therein, the manufacturing cost that occurs due to the installation of the wireless communication unit can be saved, and the productivity of the display apparatus can be improved.

Another exemplary embodiment of the inventive concept may include a display apparatus including: a wireless communication unit which includes: at least one antenna adapted to transmit and receive a radio signal to and from an external communication device; and a wireless communication board separated from the antenna and which converts a received radio signal into an electrical signal to transmit to the control board or transmits the electrical signal received from the control board to the antenna.

BRIEF DESCRIPTION OF THE DRAWINGS

The above and other aspects, features and advantages of the present inventive concept will be more apparent from the following detailed description when taken in conjunction with the accompanying drawings, in which.

DETAILED DESCRIPTION OF THE EXEMPLARY EMBODIMENTS

Hereinafter, exemplary embodiments of the present inventive concept are described in detail with reference to the accompanying drawings. The exemplary embodiments to be described hereinafter are exemplary for the understanding of the present inventive concept. However, the present inventive concept is not limited to the exemplary embodiments disclosed hereinafter, but can be implemented in diverse forms. In the drawings, sizes and relative sizes of layers and areas may be exaggerated for clarity of explanation.

Figure 1:
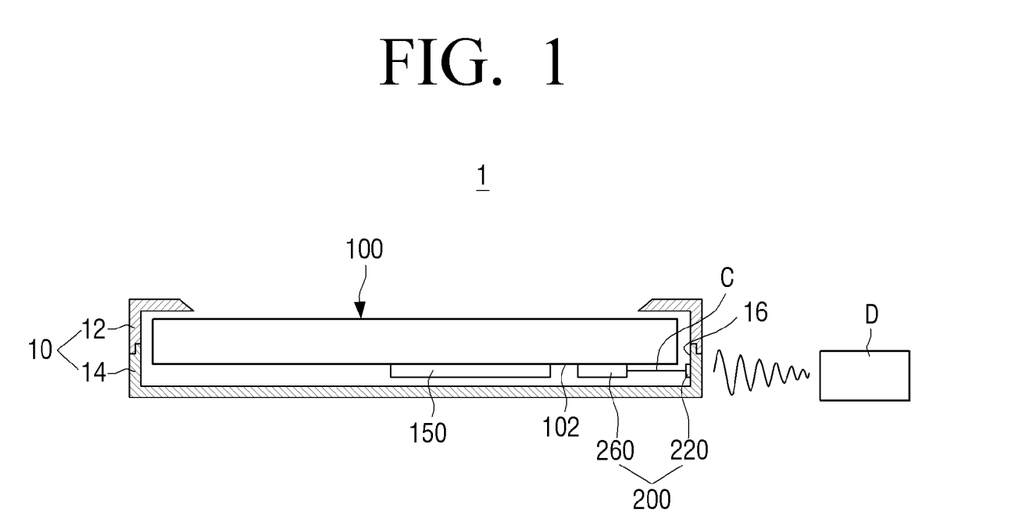
FIG. 1 is a schematic cross-sectional view illustrating a display apparatus according to an exemplary embodiment of the present inventive concept.

FIG. 1 is a schematic cross-sectional view illustrating a display apparatus according to an exemplary embodiment of the present inventive concept.

As illustrated in FIG. 1, a display apparatus 1 according to an exemplary embodiment of the present inventive concept includes an outer casing unit 10, a display module 100 having a control board 150, and a wireless communication unit 200.

The display apparatus 1 may be one of various types of display apparatuses. In this exemplary embodiment, it is assumed that the display apparatus 1 is a TV. The display apparatus 1 is provided with the wireless communication unit 200, and can perform wireless communication with an external device D. The external device D may be another device that can perform wireless communication with the display apparatus 1 or may be a wireless access point.

The outer casing unit 10 forms the entire external appearance of the display apparatus 1. The outer casing unit 10 includes a front casing 12 and a rear casing 14 that are detachably coupled to each other to accommodate the display module 100 and the wireless communication module 200. The outer casing unit 10 is made of a plastic material, and although not illustrated, in the case of a standtype display apparatus, a base may be installed on the lower portion of the outer casing unit 10.

The display module 100 displays an image on the outside of the display apparatus 1, and is provided with the control board 150 installed on one side 102 of the display module 100 to control the display module 100. The display module 100 may be a Broun tube, a plasma display, a liquid crystal display, an OLED (Organic Light Emitting Diode), or a FED (Field Emission Display). In this exemplary embodiment, it is assumed that the display module 100 is a liquid crystal display as shown in the following drawings.

The control board 150 controls the display module 100, and is installed on the rear surface of the display module 100. The control board 150 is electrically connected to the wireless communication unit 200 to send and receive data to and from the external device through the wireless communication unit 200.

The wireless communication unit 200 includes an antenna 220 and a wireless communication board 260.

The wireless communication unit 200 performs wireless communication with the external device D using a radio signal. In this exemplary embodiment, the wireless communication unit 200 supports WiFi or Bluetooth-type wireless communication. However, this is exemplary, and other wireless communication methods and apparatuses can also be used.

The antenna 220 receives a radio signal from the external device D or transmits the radio signal to the external device D. The antenna is arranged to be spatially separated from the wireless communication board 260 in the display apparatus 1.

A plurality of antennas 220 may be provided. In the case of the WiFi, two antennas are generally required, and in this exemplary embodiment, although not illustrated, it is assumed that two antennas 220 are provided. On the other hand, in the case of using Bluetooth, one antenna is required, and in this exemplary embodiment, one of the two antennas is used when the Bluetooth is used. The number of antennas 220 is exemplary, and three or more antennas may also be provided. However, as described later, signal cables the number of which is equal to the number of antennas are required. Thus, it is required to provide the antennas in consideration of the manufacturing cost, the productivity, and the possibility of the occurrence of crosstalk.

The antenna 220 is installed on the inner surface 16 of the outer casing unit 10, and specifically, is arranged in the vicinity of the border to obtain smooth transmission and reception sensitivity of the radio signal. The antenna 220 is made in a thin film shape, and by way of an example, may be a film antenna.

The wireless communication board 260 converts the radio signal received from the antenna 220 into an electrical signal to transmit the electrical signal to the control board 150, or transmits the electrical signal provided from the control board 150 to the antenna 220. As described above, the wireless communication board 260 is spatially separated from the antenna 220, and is connected to the antenna 220 through the signal cable C. The signal cable C is shielded so that it intercepts noise due to the radio signal, or the like, and thus prevents crosstalk from occurring.

The wireless communication board 260 is installed on the rear surface of the display module 100, and, although not illustrated, is connected to the control board 150 through a cable, or the like. The wireless communication board 260 is installed near the control board 150, and through this, the length of the cable between the control board 150 and the wireless communication board 260 can be reduced. On the other hand, the wireless communication board 260 may be installed on the control board 150, and this will be described in detail with reference to FIG. 3.

In this exemplary embodiment, in the wireless communication unit 200, the wireless communication board 260 is arranged to be spatially separated from the antenna 220 rather than to be installed in one modularized package together with the antenna, and thus a separate modularized package that forms the wireless communication unit 200 is not required to improve productivity. Further, since a space that corresponds to the thickness of the module itself can be secured in the display apparatus 1, it becomes possible to implement a slim display apparatus 1.

Figure 2:
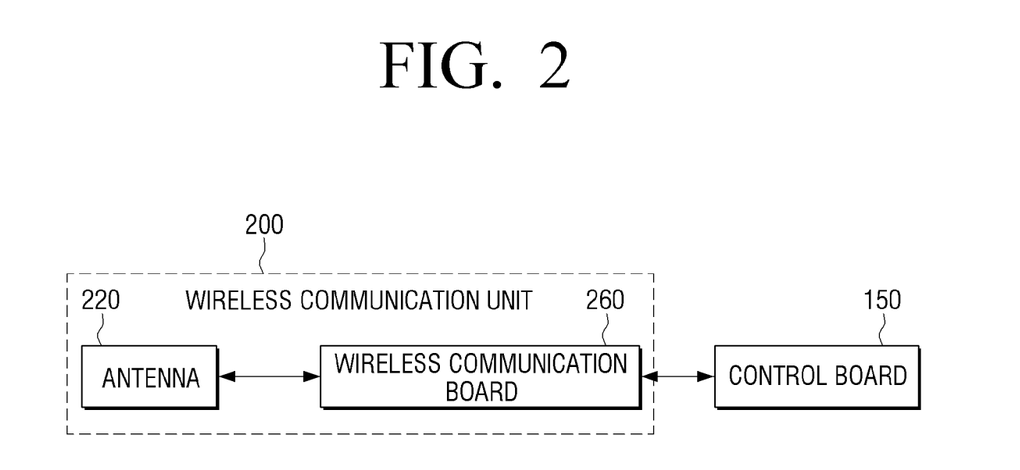
FIG. 2 is a block diagram illustrating the configuration of a wireless communication unit and a control board illustrated in FIG. 1.

FIG. 2 is a block diagram illustrating the configuration of a wireless communication unit and a control board as illustrated in FIG. 1.

As illustrated in FIG. 2, the wireless communication unit 200 includes the antenna 220 and the wireless communication board 260.

The antenna 220 transmits the radio signal to the wireless communication board 260 and receives the radio signal from the wireless communication board 260. The wireless communication board 260 converts the radio signal transmitted from the antenna 220 into the original signal to transmit the converted original signal to the control board 150, and converts the signal transmitted from the control board 150 into a radio signal to transmit the radio signal to the antenna 220. Since the function and the operation of the wireless communication unit is well known, the detailed description thereof will be omitted.

Figure 3:
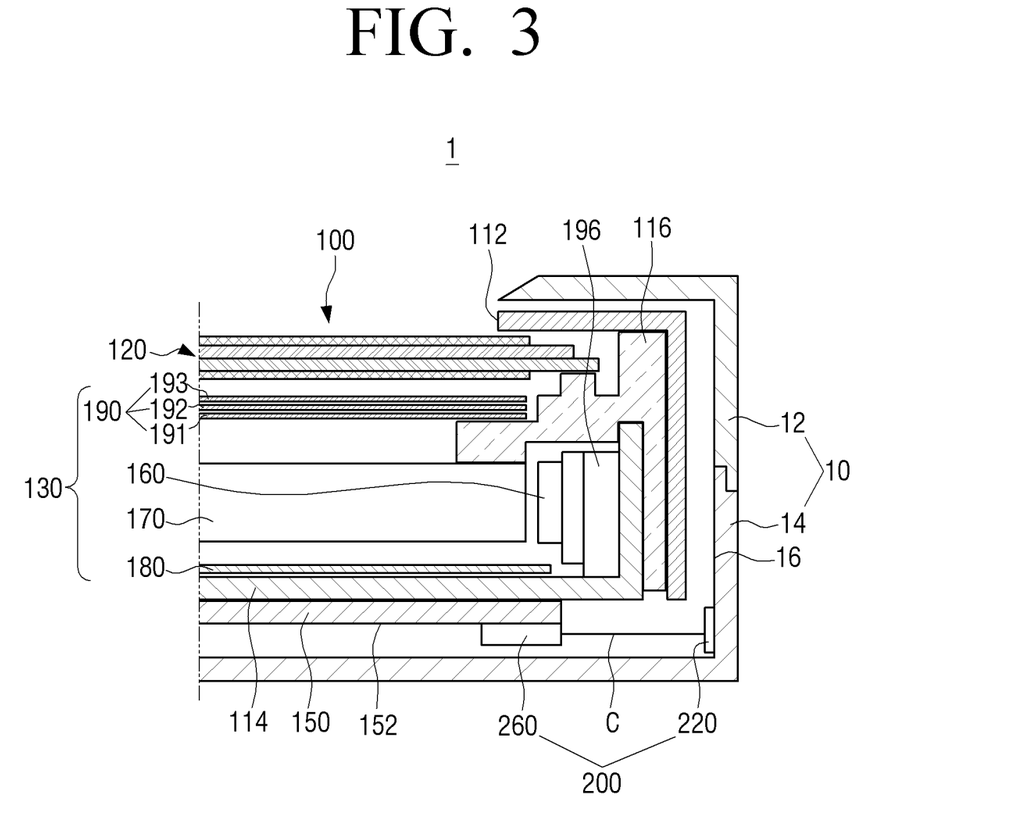
FIG. 3 is a schematic cross-section view illustrating the display apparatus of FIG. 1.

FIG. 3 is a schematic cross-section view illustrating the display apparatus of FIG. 1.

The display apparatus 1 includes the outer casing unit 10, the display module 100, and the wireless communication unit 200, and the description that is duplication of the description with reference to FIG. 1 will be omitted.

The display module 100 is a liquid crystal display, and includes a top chassis 112, a bottom chassis, an intermediate chassis 116, a liquid crystal panel 120, a backlight unit 130, and a control board 150.

The top chassis 112 and the bottom chassis 114 are mutually detachably coupled to each other and accommodate internal components of the display module 100 such as the liquid crystal panel 120 and the backlight unit 130. On the rear surface of the bottom chassis 114, the control board 150 for controlling the operation of the display module 100 and a power board (not illustrated) for supplying power, and a T-con board (not illustrated) are installed.

The intermediate chassis 116 is also called a middle mold, and supports partial components of the display module 100. For this, the intermediate chassis 116 is arranged at an edge area in the display module 100, and is arranged between the top chassis 112 and the bottom chassis 114.

The liquid crystal panel 120 receives light from the backlight unit 130, and displays a color image on the outside of the display apparatus 1. Since the configuration and the function of the liquid crystal panel 120 are well known, the detailed description thereof will be omitted.

As described above, the backlight unit 130 uniformly supplies the light to the liquid crystal panel 120, and includes a light source 160, a light guide plate 170, a reflection sheet 180, and an optical sheet 190.

The light source 160 is provided with a plurality of light sources, and emits light to the light guide plate 170. The plurality of light sources may be, for example, LEDs. On one surface of the light source 160, a heat sink plate 196 that dissipates heat emitted from the light sources is provided. Since the configuration and the function of the light source 160 and the heat sink plate 196 are well known, the detailed description thereof will be omitted.

The light guide plate 170 converts light emitted from the light source 160 to be in the form of a surface light source and directs the light toward the liquid crystal panel 120. Since the configuration and the function of the light guide plate 170 are well known, the detailed description thereof will be omitted.

The reflection sheet 180 makes lossy light that is emitted from the light guide plate 170 to the opposite side of the liquid crystal panel 120 re-incident to the light guide plate 170. Since the configuration and the function of the light guide plate 170 are well known, the detailed description thereof will be omitted.

The optical sheet 190 is arranged in front of the light guide plate 170, and includes a diffusion sheet 191, a prism sheet 192, and a protection sheet 193. The diffusion sheet 191 diffuses the light emitted from the light guide plate 170, and the prism sheet 192 condenses the light that is diffused by the diffusion sheet 191. The protection sheet 193 protects the prism sheet 192 and functions to increase the light uniformity. Since the configuration and the function of the optical sheet 190 are well known, the detailed description thereof will be omitted.

A wireless communication board 260 of a wireless communication unit 200 is installed on the bottom chassis 114, and more specifically, is installed on the rear surface 152 of the control board 150 that is installed on the bottom chassis 114 as shown in the drawing. Since the wireless communication board 260 is installed on the rear surface 152 of the control board 150, a separate cable for connecting the wireless communication board 260 and the bottom chassis 114 is not required. Accordingly, in this exemplary embodiment, since the cable C for connecting the wireless communication unit 200 and the control board 150 is required only between the antenna 220 and the wireless communication board 260, the manufacturing cost of the display apparatus 1 is saved, and the possibility of the occurrence of crosstalk is reduced.

Figure 4:
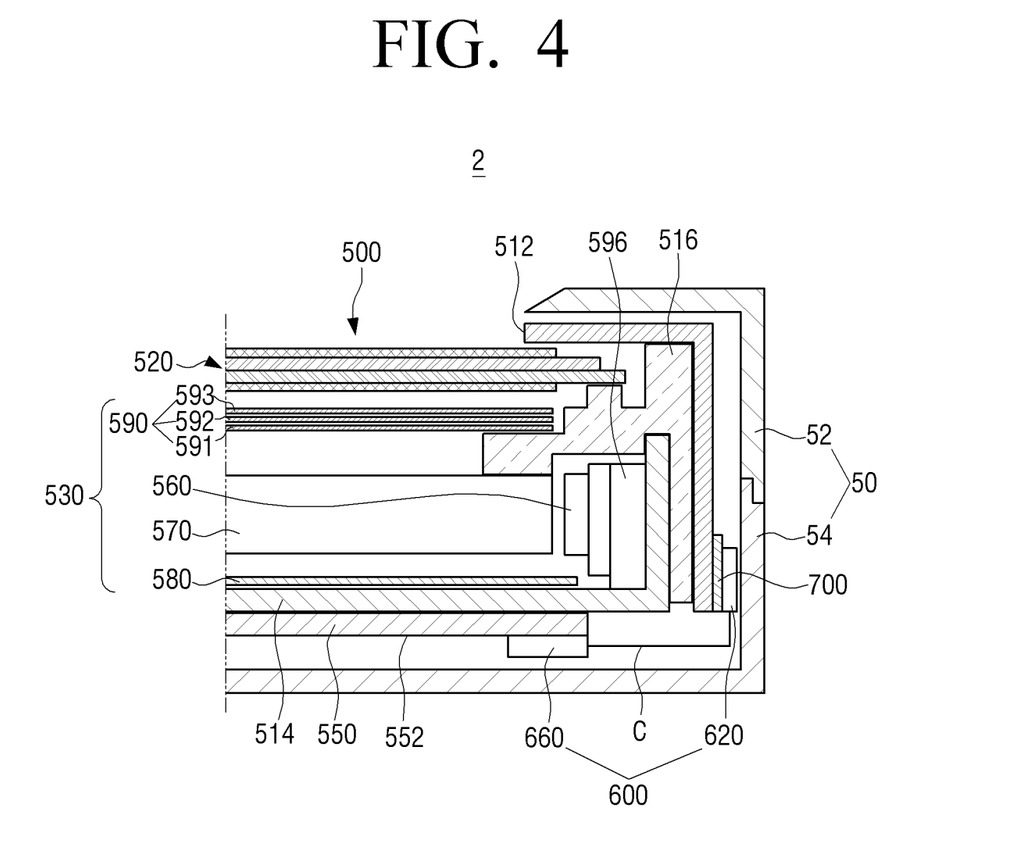
FIG. 4 is a schematic cross-sectional view illustrating a display apparatus according to another exemplary embodiment of the present inventive concept.

FIG. 4 is a schematic cross-sectional view illustrating a display apparatus according to another exemplary embodiment of the present inventive concept.

As illustrated in FIG. 4, a display apparatus 2 includes an outer casing unit 50, a display module 500, and a wireless communication unit 600.

Since the display apparatus 2 according to this exemplary embodiment is similar to the display apparatus 1 according to the previous exemplary embodiment, the description will be made centering on the difference between the apparatuses 2 and 1.

The outer casing unit 50 includes a front casing 52 and a rear casing 54.

The display module 500 includes a bottom chassis 514, an intermediate chassis 516, a liquid crystal panel 520, a backlight unit 530, a control board 550, a rear surface 552, a light source 560, a light guide plate 570, a reflection sheet 580, an optical sheet 590, a diffusion sheet 591, a prism sheet 592, a protection sheet 593, and a heat sink plate 596. Since this configuration is the same as the configuration according to the previous exemplary embodiment, the detailed description thereof will be omitted.

The wireless communication unit 600 is installed in the display module 500, and includes an antenna 620 and a wireless communication board 660.

The antenna 620 is installed on the outer surface of the top chassis 512, and is arranged between the outer surface of the display module 500 and the inner surface of the outer casing unit 50. The antenna may be installed on the bottom chassis if the bottom chassis is arranged at the edge of the display module depending on the coupling state of the top chassis and the bottom chassis, and may be installed on the intermediate chassis if the intermediate chassis is arranged at the edge of the display module.

The display module 620 includes a bracket 700 provided on the outer surface of the top chassis 512. The bracket 700 is to install the antenna 620 on the top chassis 512, and is made of a non-metallic material such as plastic, or the like. In general, the top chassis 512, the bottom chassis 514, and the intermediate chassis 516 are made of a metallic material. If the antenna 620 becomes in contact with the metallic material, the transmission and reception sensitivity of the radio signal is lowered, and thus the non-metallic bracket 700 is used when the antenna 620 is installed on the top chassis 512. If the top chassis is made of a non-metallic material, the antenna can be directly installed on the top chassis without the bracket.

In this exemplary embodiment, since the wireless communication unit 600 is installed in the display module 500 as a whole, the installation of the wireless communication unit 600 can be completed in the process of manufacturing the display module 500, and thus the productivity and the manufacturing efficiency can be increased.

Figure 5:
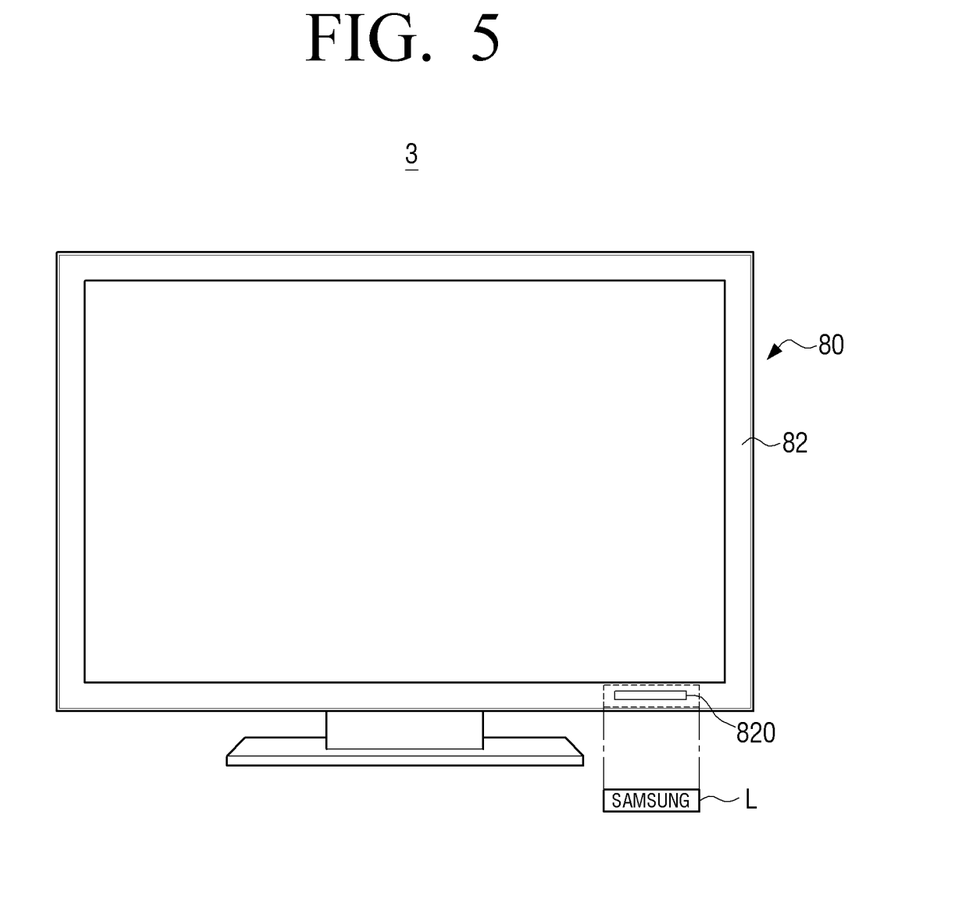
FIG. 5 is a schematic cross-sectional view illustrating a display apparatus according to still another exemplary embodiment of the present inventive concept.
Figure 6:
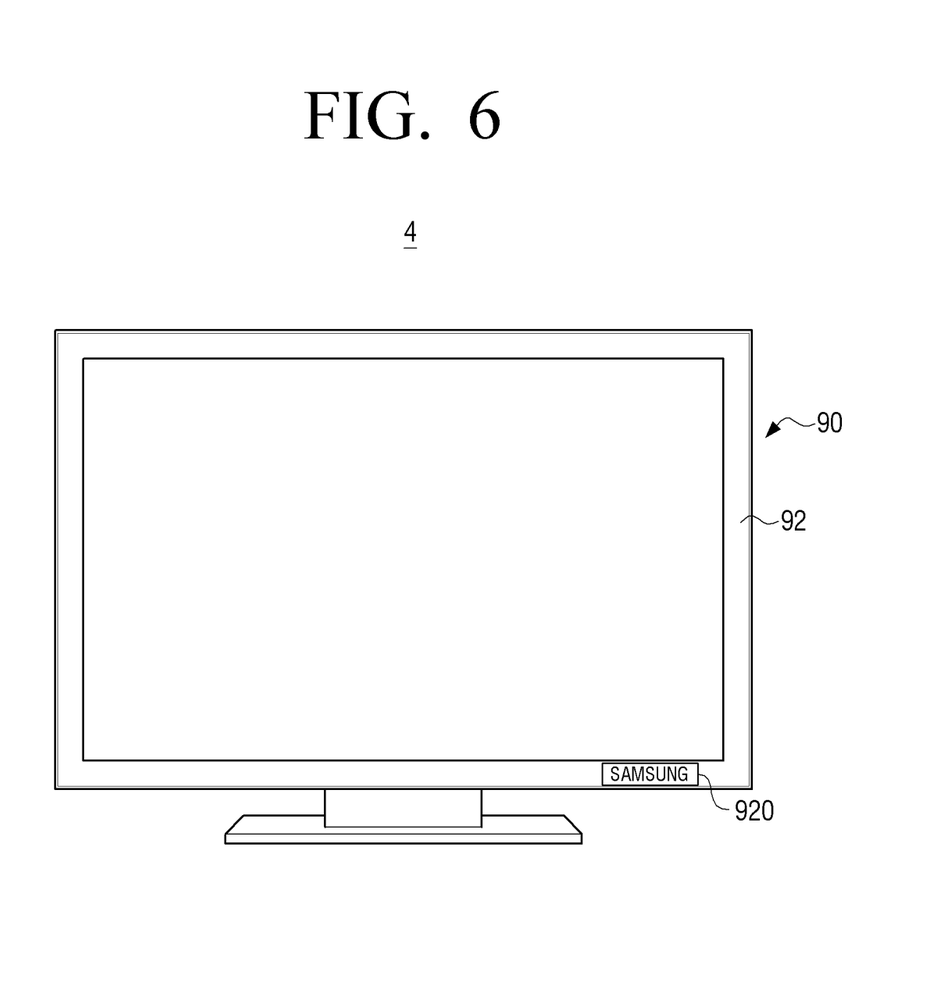
FIG. 6 is a schematic view illustrating a display apparatus according to yet still another exemplary embodiment of the present inventive concept.

FIG. 5 is a schematic cross-sectional view illustrating a display apparatus according to still another exemplary embodiment of the present inventive concept, and FIG. 6 is a schematic view illustrating a display apparatus according to yet still another exemplary embodiment of the present inventive concept.

As illustrated in FIG. 5, a display apparatus 3 includes an outer casing unit 80 that includes a front casing 82 and a rear casing (not illustrated). Since the rear casing is arranged in the rear of the front casing as shown in FIG. 1, the rear casing is not shown in FIG. 5.

Since the display apparatus 3 is similar to the display apparatuses 1 and 2 according to the previous exemplary embodiments, the detailed description thereof will be omitted, and the description will be made centering on the differences between the display apparatuses.

The front casing 82 includes a product logo L. The product logo L is a combination of characters or pictures which has been devised to indicate an image of the manufacturer or product characteristics, and is mainly arranged on the front surface of the display apparatus such as the TV. The antenna 820 is installed on the front casing 82, and the product logo L is arranged in front of the antenna 820.

As illustrated in FIG. 6, a display apparatus 4 includes an outer casing unit 920 that includes a front casing 92 and a rear casing (not illustrated). The rear casing is not shown in the drawing in the same manner as in FIG. 5. The antenna 920 is installed on the front surface of the front casing 92, and a product logo is directly formed on the antenna 920.

While the present inventive concept has been shown and described with reference to certain exemplary embodiments thereof, it will be understood by those skilled in the art that various changes in form and detail may be made therein without departing from the spirit and scope of the present inventive concept, as defined by the appended claims.

What is claimed is:

1. A display apparatus comprising:
   a display module including a control board which controls an operation of the display module to display an image;
   an outer casing unit which accommodates the display module; and
   a wireless communication unit which performs wireless communication with an external communication device,
   the wireless communication unit includes:
   at least one antenna for transmitting and receiving a radio signal to and from the external communication device; and
   a wireless communication board which converts the radio signal received from the antenna into an electrical signal to transmit the electrical signal to the control board or transmits the electrical signal provided from the control board to the antenna,
   wherein the antenna and the wireless communication board are arranged to be spatially separated from each other as non-modularized components of the display apparatus and are arranged within the display apparatus, and
   the antenna is connected to the wireless communication board by a shielded signal cable.

2. The display apparatus as claimed in claim 1, wherein the antenna is installed in the outer casing unit, and the wireless communication board is installed in the display module.

3. The display apparatus as claimed in claim 2, wherein the display module includes:
   a liquid crystal panel creating the image;
   a backlight unit supplying light for creating the image to the liquid crystal panel; and a top chassis and a bottom chassis accommodating therein the liquid crystal panel and the backlight unit.

4. The display apparatus as claimed in claim 3, wherein the wireless communication board is installed in the bottom chassis.

5. The display apparatus as claimed in claim 3, wherein the control board is installed in the bottom chassis, and the wireless communication board is installed on the control board.

6. The display apparatus as claimed in claim 2, wherein the outer casing unit includes:
   a front case having a product logo; and
   a rear casing coupled to the front casing,
   wherein the product logo is arranged in front of the antenna.

7. The display apparatus as claimed in claim 6, wherein the product logo is formed directly on the antenna.

8. The display apparatus as claimed in claim 1, wherein the antenna and the wireless communication board are installed in the display module.

9. The display apparatus as claimed in claim 8, wherein the display module includes:
   a liquid crystal panel creating the image;
   a backlight unit supplying light for creating the image to the liquid crystal panel; and
   a top chassis and a bottom chassis accommodating therein the liquid crystal panel and the backlight unit.

10. The display apparatus as claimed in claim 9, wherein the antenna is installed in the top chassis.

11. The display apparatus as claimed in claim 10, wherein the display module further includes a bracket for installing the antenna in the top chassis.

12. The display apparatus as claimed in claim 11, wherein the bracket is made of a non-metallic material.

13. The display apparatus as claimed in claim 10, wherein the control board is installed in the bottom chassis, and the wireless communication board is installed on the control board.

14. The display apparatus as claimed in claim 1, wherein the wireless communication unit performs wireless communication according to at least one of WiFi and Bluetooth.

15. The display apparatus as claimed in claim 1, wherein the antenna is a film antenna.

16. A display apparatus comprising: a wireless communication unit, the wireless communication unit further including:
   at least one antenna adapted to transmit and receive a radio signal to and from an external communication device; and
   a wireless communication board separated from the antenna and which converts a received radio signal into an electrical signal to transmit to a control board or transmits the electrical signal received from the control board to the antenna,
   wherein the wireless communication board and the antenna are non-modularized components of the display apparatus and are arranged within the display apparatus,
   wherein the display module includes:

a liquid crystal panel creating the image; a backlight unit supplying light for creating the image to the liquid crystal panel; and a top chassis and a bottom chassis accommodating therein the liquid crystal panel and the backlight unit, and the antenna is connected to the wireless communication board by a shielded signal cable, wherein the antenna is installed in an outer casing unit outside of a display module, and the wireless communication board is installed in the display module.

17. The display apparatus as claimed in claim 16, wherein the wireless communication board is installed in the bottom chassis.

\* \* \* \* \*